Sept. 12, 1967  L. H. GOLLWITZER  3,340,955
LOGGING APPARATUS WITH PEAK AMPLITUDE MEASUREMENT OF A
SELECTED HALF-CYCLE
Filed Aug. 3, 1959  2 Sheets-Sheet 1

INVENTOR.
Lee H. Gollwitzer
BY
Donald H. Fidler
ATTORNEY

Sept. 12, 1967 L. H. GOLLWITZER 3,340,955
LOGGING APPARATUS WITH PEAK AMPLITUDE MEASUREMENT OF A
SELECTED HALF-CYCLE
Filed Aug. 3, 1959 2 Sheets-Sheet 2

INVENTOR.
Lee H. Gollwitzer
BY
Donald H. Fidler
ATTORNEY

United States Patent Office 3,340,955
Patented Sept. 12, 1967

3,340,955
LOGGING APPARATUS WITH PEAK AMPLITUDE
MEASUREMENT OF A SELECTED HALF-CYCLE
Lee H. Gollwitzer, Houston, Tex., assignor, by mesne
assignments, to Schlumberger Technology Corporation,
Houston, Tex., a corporation of Texas
Filed Aug. 3, 1959, Ser. No. 831,328
21 Claims. (Cl. 181—.5)

This invention relates to borehole velocity logging systems, and, more particularly, to apparatus and methods for detecing amplitude changes of an electrical signal representing acoustic energy to provide indications of characteristics of the borehole.

Generally speaking, acoustic velocity logging entails the use of an acoustic wave transmitter and one or more acoustic wave receivers, all movable through a borehole drilled into the earth. The transmitter is energized periodically so that pulses of acoustic wave energy are emitted. Each pulse is propogated through the drilling liquid which usually fills the borehole and thus passes into the adjacent earth formations. Acoustic wave energy travels through the formations and some is intercepted by the receiver or receivers and an electrical signal representing the wave energy is developed. An appropriate measuring circuit is connected to the receivers (or to a single receiver and a transmitter keying circuit) thereby to provide indications dependent upon the travel time ($\Delta t$) of acoustic wave energy between the receivers (or from the transmitter to the receiver) through the adjacent formations. The generated acoustic wave energy involves a complex propagation generally consisting of longitudinal waves, shear waves, surface waves and fluid waves. The present invention shall be discussed in relation to longitudinal waves; however, it will be appreciated that it is not necessarily limited thereto.

The electrical signal developed by the receivers (or receiver) for the measuring circuit which is attributed to the longitudinal mode of wave propagation has a series of alternations of which the first cycle has been found to have the greatest reliability in representing the acoustic energy from the transmitter which passes through the adjacent earth formations. It has also been found that fissures in the earth formations, gas-bearing zones and casing which is cemented to the borehole wall have an effect on the amplitude of the developed electrical signal. Hence, it will be appreciated that measurement of the amplitude changes of a selected portion of the first cycle of the electrical signal will provide information for detecting fissures, gas-bearing zones and cementing behind a casing.

Accordingly it is an object of the present invention to provide new and improved velocity logging systems for obtaining information of fissures and gas-bearing zones in a borehole, and casing which is cemented to the borehole.

It is another object of the present invention to provide new and improved velocity logging apparatus for measuring the amplitude of a selected portion of an electrical signal representing acoustic energy.

Still another object of the present invention is to provide new and improved methods of logging open and cased boreholes.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

Figure 1:
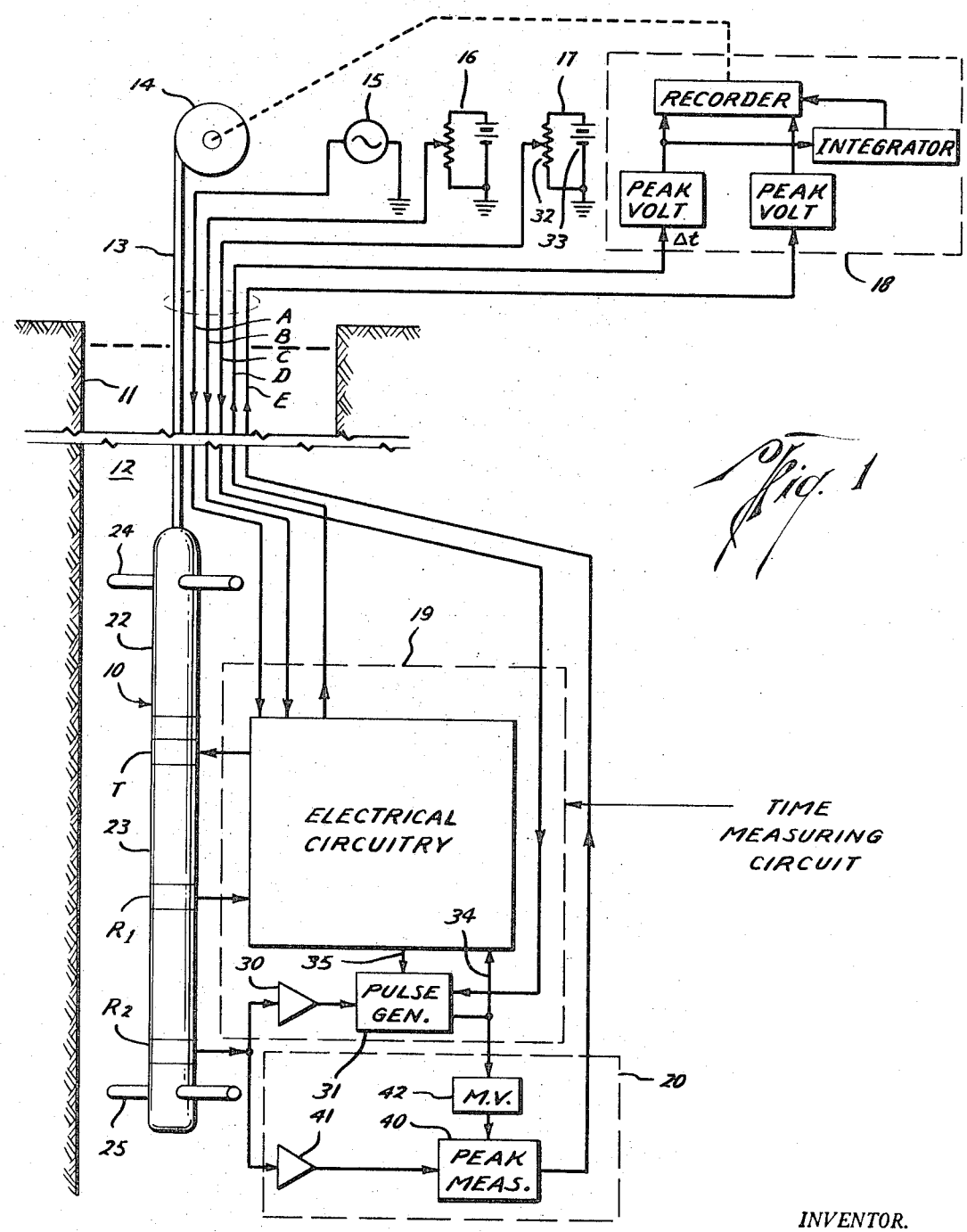
FIG. 1 is a schematic diagram of a sonic logging system and including apparatus embodying the present invention in a sectional view of the earth with circuit components illustrated in block diagram form.

Referring now to FIG. 1, acoustic logging apparatus 10 incorporating the present invention is adapted to be passed through a bore 11 (only partially shown) which contains the usual well fluid 12. Alternatively, the wall of bore 11 could be cemented to a casing (not shown) if desired. The apparatus 10 is passed through the bore by means of a conventional multiconductor electrical cable 13 and winch 14 which is located at the earth's surface.

Apparatus 10 generally includes an upper pressure resistant housing 22 for the various electrical assemblies coupled to a lower section 23 which supports a transmitter T and longitudinally-spaced receivers $R_1$ and $R_2$. The transmitters and receivers may be transducers of the magnetostrictive type separated from each other at a proper distance by a supporting structure with a characteristic lower acoustic velocity than the velocity of the earth formations to be measured. A suitable spacing between the transmitter and receiver $R_1$ may be three feet while the span between the receivers $R_1$ and $R_2$ may also be three feet. It will be appreciated that the spacing and span may be varied if desired. The entire apparatus 10 is centered in the borehole by centralizing means such as rubber fingers 24, 25 at the upper and lower extremities of the apparatus.

The electrical assemblies in the housing are shown to the right of the apparatus 10 for convenience of illustration and include a time measuring circuit 19 for obtaining indications of the time interval ($\Delta t$) between the first arrival of acoustic energy at each of the receivers $R_1$ and $R_2$ and a peak measuring device 20 for measuring the peak amplitude of a selected portion of a developed signal. The conductors A–D of the cable couple a power source 15, sensitivity controls 16, 17 and indicating means 18 at the earth's surface to the time ($\Delta t$) measuring circuitry 19 in the apparatus 10. The peak measuring device 20 embodying the present invention is coupled by a conductor E to the surface indicating means 18. A conventional power supply (not shown) in measuring circuit 19 converts an applied alternating current into unidirectional potentials of appropriate magnitudes for operation of the various circuit elements within the apparatus.

The time measuring circuit 19 is more completely described in the copending application of F. Kokesh, Ser. No. 745,548, filed June 30, 1958, now Patent No. 3,231,-041, which is assigned to the assignee of the present invention and will only be described briefly herein to present a clearer understanding of the present invention. Circuitry 19 is arranged to periodically pulse the transmitter T to produce acoustic wave energy which is propagated through the well fluid and earth formations and successively intercepted by receivers $R_1$ and $R_2$. The electrical signal developed by the respective receivers has a series of alternations wherein the first cycle of alternation is comprised of a relatively small peak amplitude with a given polarity relative to a reference followed by a second, substantially larger peak amplitude with an opposite polarity relative to the reference. The succeeding cycles of the signal have substantially larger peak amplitudes than the first or second peaks; however, it has been found that the amplitude or character of these cycles varies in accordance with complex factors in the logging operation such as reflecting waves and thus includes effects other than the wave energy as emitted by the transmitter. Hence, for purposes of analysis of the wave energy transmitted and to measure the travel time, the first cycle of the electrical signal is generally considered the most significant and reliable.

The travel time indications are obtained in circuitry 19 by triggering a timing generator in response to a characteristic of the developed signal at one of the receivers. An exemplary arrangement of a triggering circuit is shown in FIG. 1 wherein receiver $R_2$ is coupled via an amplifier 30 to a pulse generator 31. The bias control circuit (not shown) of the pulse generator 31 is coupled by the cable conductor C to a surface sensitivity control circuit 17. The control circuit 17 includes a potentiometer 32 connected in series with a battery 33 and thus may adjust the bias level on the generator 31 in a conventional manner so that with a proper setting of the threshold level or bias above the first peak of the first cycle but below the expected second peak of the signal, the pulse generator 31 will respond to the second part of the first cycle to develop an output signal which is supplied via a conductor 34 to time indicating means (not shown) in the electrical circuitry 19. The first part of the first cycle is generally of small amplitude and is not used to indicate first arrivals since small amplitude "noise" signals will introduce errors by prematurely triggering the generator 31.

The pulse generator 31 is also controlled by a gate circuit (not shown) which applies a control pulse to the generator via conductor 35 just prior to the earliest possible arrival at receiver $R_2$ to condition the pulse generator 31 for operation. Pulse generator 31 is of conventional construction arranged so that no output signal is produced unless a control pulse is supplied to the control circuit.

Apparatus in accordance with the present invention is embodied in the peak measuring device 20 and includes a peak measuring circuit 40 for selectively obtaining an output which is representative of the peak amplitude of a half-cycle of the signal developed by the receiver $R_2$. The receiver $R_2$ is coupled to the peak measuring means via an amplifying means 41 while a control circuit in the peak measuring circuit 40 is coupled to the output of a conventional multivibrator 42. The multivibrator 42 is arranged to produce a control pulse with a time interval slightly less than one-half the period of the signal and is actuated by the output pulse of the pulse generator 31. Thus, although the peak measuring circuit 40 may receive signals from receiver $R_2$, the circuit remains inoperative until the pulse generator 31 produces a pulse which actuates the multivibrator 42 to produce a control pulse. The control pulse applied to the control circuit of the peak measuring circuit 40 permits the amplitude of the signal to be obtained for purposes of indication during the time interval of the control pulse and develop an output signal which is passed via cable conductor E to the indicating means 18.

Figure 2:
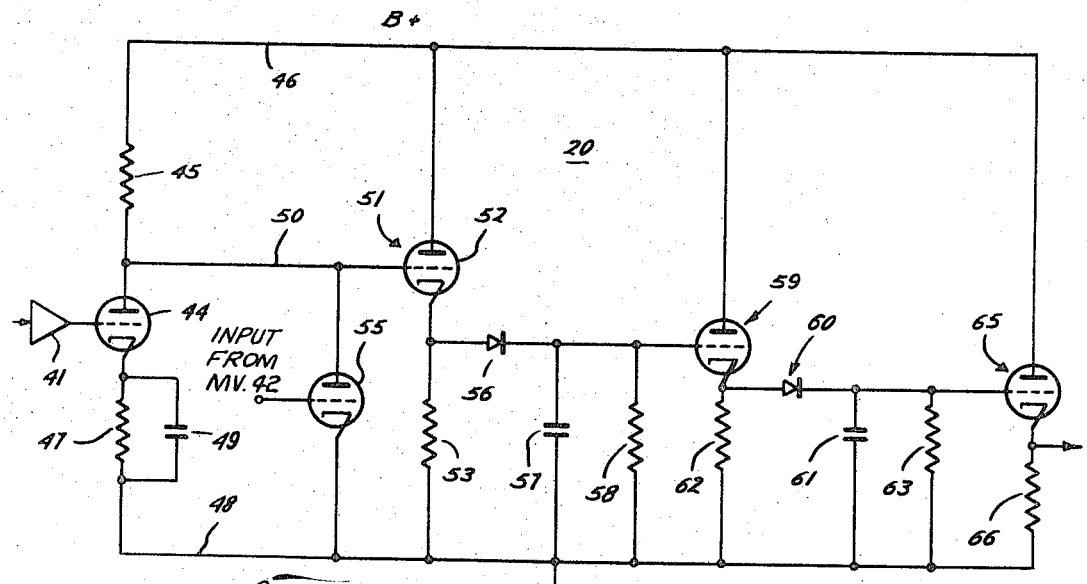
FIG. 2 is a detailed circuit diagram embodying the present invention in one form.

Referring now to FIG. 2, portions of the peak measuring device 20 are illustrated in greater detail. In particular, the input from the amplifier 41 is supplied to the grid of a normally-conducting triode tube 44 which has a plate connected through a plate resistor 45 to a positive voltage lead 46 and a cathode connected through a cathode resistor 47 to the negative or ground potential lead 48. Cathode resistor 47 is shunted with a bypass capacitor 49 in a customary manner.

The output of tube 44 is coupled by a conductor 50 to a cathode follower circuit 51 wherein the plate of a triode tube 52 is directly coupled to the positive voltage lead 46 and the cathode is coupled through a cathode resistor 53 to the ground potential lead 48. Hence, from the apparatus of FIG. 2 thus far described, it will be appreciated that with a signal input from amplifier 41, a voltage signal from tube 44 will produce a flow of output current in the cathode resistor 53.

The signal control circuit for the cathode follower circuit 51 includes a gating means consisting of a normally-conducting triode 55 coupled between the cathode follower input conductor 50 and the ground conductor 48, and a unidirectional-conducting means 56 and capacitor 57 connected in series shunted across the cathode resistor 53. The unilateral-conducting device 56 may take any conventional form such as, for example, that of a vacuum tube diode or semiconductor diode and is so poled that positive going signals of sufficient magnitude on the cathode of tube 52 will tend to drive it into conduction. Hence, if no signal is applied to the grid of the gating tube 55, a signal on the plate of amplifier tube 44 will be effectively bypassed by the gating tube 55 so that the output produced by the cathode follower circuit 51 is of insufficient magnitude to cause diode 56 to conduct. However, if a gating pulse is applied to the grid of the gating tube 55 to render it nonconductive, the signal from tube 44 will be passed to the cathode follower circuit 51 so that diode 56 conducts and current flows into condenser 57.

It will be recalled that pulse generator 31 produces an output on the second half of the first cycle and that this pulse triggers the multivibrator 42, and multivibrator 42 supplies a pulse with a sufficient time duration to gate tube 55 (rendering it nonconductive) only for the second half of the first cycle so that only one peak of the signal is supplied to the cathode follower circuit 51.

A resistance 58 is shunted across capacitor 57, and the output of the capacitor 57 is supplied to another cathode follower 59. The output circuit of the cathode follower 59 includes a cathode resistor 62 which is shunted by a diode 60 and capacitor 61 connected in series. Capacitor 61 is shunted by a resistance 63. The output of capacitance 61 is supplied to still another cathode follower 65 which has cathode resistance 66 coupled via the cable to the surface indicating instruments 18. The cathode follower circuits 51 and 59 in series insure an adequate response of the circuits to develop an output signal representative of the peak value of the electrical signal.

Considering a practical example of the foregoing apparatus, if the frequency of the signal is, for example, 30 kilocycles, its period would be 33 microseconds and a half period would be approximately 17 microseconds. Multivibrator 42 is arranged to produce a 15 microsecond control pulse in response to the output of pulse generator 31 so that only the second peak of the first cycle will be passed to the cathode follower 51. Hence, the flow of current into the condenser 57 will occur in a time interval of 15 microseconds. To permit the capacitor 57 to be completely charged up by the current flow, a value such as .005 microfarad is employed. Once the capacitor 57 is charged up, the peak value attained is retained for a length of time by a large resistance value of resistor 58, for example, two meg ohms. Hence, the time constant would be .01 second for resistance 58 and capacitor 57. Cathode follower 59 produces an output signal in response to the output signal of the capacitor 57 to charge up capacitor 61. Capacitor 61 may have a value such as .05 microfarad while resistnce 63 may be 20 meg ohms so that a time constant of 0.1 second provides a sufficient time for the peak value to be supplied to the output cathode follower 65.

If desired, the cathode follower 65, resistance 63, capacitor 61 and diode 60 may be omitted by varying the values of resistance 58 and capacitor 57. For example, resistance 58 may be 20 meg ohms while capacitor 57 is 0.05 microfarad which will give a time constant of .1 second. The long time constant, of course, permits ample time for response of the indicating means 18.

Figure 3:
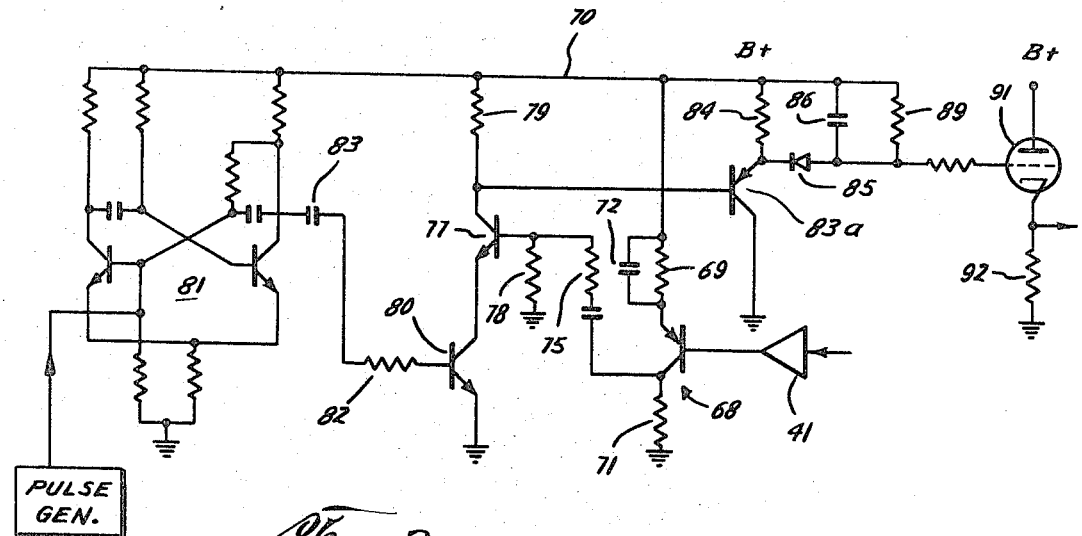
FIG. 3 is a detailed circuit diagram embodying the present invention in another form.

Referring now to FIG. 3, a transistorized circuit is shown which embodies the present invention but is arranged in a slightly different manner to accomplish the same results as the tube circuit of FIG. 2. In FIG. 3, the signal input from amplifier 41 is applied to the base electrode of a P-N-P type transistor 68, the emitter electrode being connected via a biasing resistance 69 to a lead 70 connected to a positive source of potential while the collector electrode is coupled via a load resistance 71 to a ground return. The biasing resistance 69 may be bypassed by a condenser 72 to prevent loss of gain by degeneration.

The transistor 68 is normally-conducting so that an input signal to the base electrode is amplified in the collector electrode output. The output signal taken from the collector electrode is applied via a coupling resistance and capacitor 75 to the base of a N-P-N type transistor 77, the base electrode of transistor 77 being suitably reversed-biased by a resistance 78 coupled to ground.

The transistor 77 includes a collector electrode coupled through a load resistance 79 to the positive potential conductor 70 and an emitter electrode which is coupled in series to the collector of another N-P-N type transistor 80, the emitter electrode of the transistor 80 being coupled to the ground return. The transistor 80 serves as a gating means and has a base electrode which receives the output of a conventional multivibrator 81 via a resistance 82 and capacitor 83 connected in series. The multivibrator 81 is arranged in a well-known manner to develop a pulse having a time duration less than a half period of the signal. The input of multivibrator 81 is coupled to the pulse generator 31.

The transistors 77 and 80 coupled in series are effectively a series gating circuit, the transistors being normally nonconducting so as to present a high impedance to the circuit. Thus, when the gating pulse from the multivibrator 81 renders the transistor 80 conductive, a signal simultaneously applied to the transistor 77 is amplified in its collector circuit. The collector of transistor 77 is coupled to the base electrode of another transistor 83a which has a grounded collector electrode and an emitter electrode coupled through a load resistance 84 to the positive potential lead 70. Shunted across the load resistance 84 are a unilateral-conducting means 85 and a capacitor 86 connected in series. The unilateral-conducting means 85 is poled so that a negative-going pulse at the emitter electrode of transistor 83 tends to drive the unilateral-conducting means 85 into conduction. Shunted across the capacitor 86 is a resistance 89, the resistance 89 and capacitor 86 having a long time constant, for example, .1 second. The output from the capacitor 86 is supplied to a cathode follower 91 where the output is taken across the cathode resistance 92 and supplied via the cable to the surface indicating means 18. The transistor 83a functions as a current amplifier to supply charging current for capacitor 86.

The operation of the electrical apparatus of FIGS. 2 and 3 is thought to be readily apparent from the foregoing description and thus will not be further elaborated. The general operation of apparatus 10 is likewise thought to be apparent. The Δt or velocity indications obtained will provide information as to the type of formations that the apparatus 10 traverses while the amplitude level will indicate the consistency of the formations. In other words, should fissures or gas-bearing zones be traversed, the record of the amplitude of signal at one receiver will show a decreased amplitude value and the relative distance over which the decreased amplitude signal extends will provide an indication to distinguish fissures from gas-bearing zones. In a cased hole with suitably bonded cement, the amplitude value recorded will show an increase in value where the cement fails to bond or the cement top is reached.

It should also be noted that the present invention provides an accurate detection of a peak amplitude in the bore, thus only a magnitude of voltage is sent up the cable. Hence, measurement inaccuracies due to cable effects are minimized if not completely eliminated.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. In an acoustic logging system for use in a borehole: means for developing an electrical signal in response to acoustic energy in the borehole, said electrical signal having a series of alternations; first circuit means selectively operable for producing a flow of output current in response to said electrical signal; gating means coupled to receive said electrical signal and responsive to a given characteristic thereof for selectively operating said first circuit means during a preselected half-cycle only of said electrical signal; and second circuit means responsive to the output current of said first circuit means for providing a signal which is representative of the peak amplitude of said preselected half-cycle of said electrical signal.

2. In an acoustic logging system for use in a borehole: a support adapted for passage through a borehole; means in said support for developing an electrical signal in response to acoustic energy in the borehole, said electrical signal having a series of alternations; amplifying means in said support selectively operable for producing a flow of output current in response to said electrical signal; gating means in said support coupled to receive said electrical signal and responsive to a given characteristic of a preselected half-cycle of said electrical signal for selectively operating said amplifying means only during said preselected half-cycle of said electrical signal; output circuit means in said support responsive to the output current of said amplifying means for providing a signal which is representative of the peak amplitude of said preselected half-cycle of said electrical signal; means at the surface of the earth for providing an indication of said peak amplitude as a function of the depth of said support in the borehole; and means coupling said output circuit means to said surface means.

3. In an acoustic logging system for use in a borehole: means for developing an electrical signal in response to acoustic energy in the borehole, said electrical signal having a series of alternations; amplifying means selectively operable for producing a flow of output current in response to said electrical signal; gating means coupled to receive said electrical signal and responsive to a given characteristic of a preselected half-cycle of said electrical signal for selectively operating said amplifying means only during said preselected half-cycle of said electrical signal; and output circuit means coupled to said amplifying means for providing a signal which is representative of the peak amplitude of said preselected half-cycle of said electrical signal including unilateral-conducting means and current storage means responsive to the output current of said amplifying means.

4. In an acoustic logging system for use in a borehole: means for developing an electrical signal in response to acoustic energy in the borehole, said electrical signal having a series of alternations; current amplifying means selectively operable for producing a flow of output current in response to said electrical signal; gating means coupled to receive said electrical signal and responsive to a given characteristic thereof for selectively operating said current amplifying means during a preselected half-cycle only of said electrical signal; and second circuit means coupled to said amplifying means for providing a signal which is representative of the peak amplitude of said preselected half-cycle of said electrical signal including unilateral-conducting means and current storage means responsive to the output current of said current amplifying means.

5. In an acoustic logging system for use in a borehole having a transducer for intercepting acoustic energy propagated in the borehole; means for developing an electrical signal in response to acoustic energy intercepting said transducer, said electrical signal having a series of alternations; first circuit means selectively operable for producing a flow of output current in response to said electrical signal; gating means coupled to receive said electrical signal and responsive to a first characteristic arrival thereof for selectively operating said first circuit means during a period of a preselected half-cycle only of said electrical signal provided to said first circuit means; and second circuit means coupled to said first circuit means for providing a signal which is representative of the peak amplitude of said preselected half-cycle of said electrical signal including unilateral-conducting means and current storage means responsive to the output current of said first circuit means.

6. In an acoustic logging system for use in a borehole: transducer means arranged for intercepting acoustic energy propagated in the borehole and for developing an electrical signal in response to acoustic energy intercepting said transducer wherein said electrical signal is characterized by a series of alternations; circuit means for producing a flow of output current and having input means coupled to said signal developing means and output means including unilateral-conducting means and current storage means coupled in series; gating means shunt coupled to the input means of said circuit means and responsive to a first characteristic arrival of said electrical signal for selectively applying a portion of a preselected half-cycle only of said electrical signal to said first circuit means whereby said current storage means provides a signal which is representative of the peak amplitude of said preselected half-cycle of said electrical signal.

7. In an acoustic logging system for use in a borehole: means for developing an electrical signal in response to acoustic energy in the borehole, said electrical signal having a series of alternations; first circuit means coupled to said developing means selectively operable for producing a flow of output current in response to said electrical signal; gating means coupled to said developing means and responsive to a first arrival of said electrical signal for operating said first circuit means during a preselected half-cycle only of said electrical signal; and second circuit means coupled to said first circuit means for providing a signal representing the peak amplitude of said preselected half-cycle of said electrical signal and including unilateral-conducting means and current storage means responsive to the output current of said first circuit means and a shunt-coupled resistance element across said current storage means.

8. In an acoustic logging system for use in a borehole: means for developing an electrical signal in response to acoustic energy in the borehole, said electrical signal having a series of alternations; first circuit means selectively operable for producing a flow of output current in response to said electrical signal; gating means coupled to said developing means and responsive to a first arrival of said electrical signal for operating said first circuit means during a preselected half-cycle only of said electrical signal to said first circuit means; and second circuit means coupled to said first circuit means for providing a signal which is representative of the peak amplitude of said preselected half-cycle of said electrical signal and including unilateral-conducting means and current storage means responsive to the output current of said first circuit means and a shunt-coupled resistance element across said current storage means, said second circuit means having a relatively long time constant compared to the time interval of said preselected half-cycle of said electrical signal.

9. In an acoustic logging system for use in a borehole: means for developing an electrical signal in response to acoustic energy in the borehole, said electrical signal having a series of alternations; first circuit means coupled to said developing means selectively operable for producing a flow of output current in response to said electrical signal; gating means coupled to said developing means and responsive to a first arrival of said electrical signal for operating said first circuit means during a preselected half-cycle only of said electrical signal to said first circuit means; and second circuit means coupled to said first circuit means for providing a signal which is representative of the peak amplitude of said preselected half-cycle of said electrical signal and including unilateral-conducting means and current storage means responsive to the output current of said first circuit means and a shunt-coupled resistance element across said current storage means, said second circuit means having a relatively long time constant as compared to the time interval of said preselected half-cycle of said electrical signal and said current storage means having a low capacitance value to permit rapid build up of current.

10. In an acoustic logging system for use in a borehole: means for developing an electrical signal in response to acoustic energy propagated in the borehole, said electrical signal having a series of alternations; a voltage amplifying circuit coupled to said developing means; a current amplifying circuit coupled to said voltage amplifying circuit; a gating circuit shunted across the input to said current amplifying circuit and responsive to a first detected arrival of said electrical signal to render said current amplifying circuit operative for approximately one preselected half-cycle of said electrical signal; an output circuit responsive to said current amplifying circuit and including unilateral-conducting means and current storage means arranged to obtain a signal representative of the peak value of said preselected half-cycle, said output circuit further including a resistance shunted across said current storage means.

11. In an acoustic logging system for use in a borehole having a transducer for intercepting acoustic energy propagated in the borehole; means for developing an electrical signal in response to acoustic energy intercepted by said transducer, said electrical signal having a series of alternations; a pulse circuit coupled to said signal developing means producing a pulse output having a time duration substantially equal to one half-cycle of said electrical signal upon detection of a first arrival of acoustic energy; a voltage amplifying circuit coupled to said developing means; a current amplifying circuit coupled to said voltage amplifying circuit; a gating circuit shunted across the input to said current amplifying circuit and responsive to said pulse output to render said current amplifying circuit operative for one preselected half-cycle of said electrical signal; an output circuit coupled to said circuit amplifying circuit for obtaining the peak amplitude of said preselected half-cycle of said electrical signal including unilateral-conducting means and current storage means arranged to obtain the peak value of said preselected half-cycle, said output circuit further including a resistance shunted across said current storage means.

12. In an acoustic logging system for use in a borehole: a support adapted for passage through a borehole; spaced transducer means carried by said support for generating and receiving pulses of acoustic energy; means for developing an electrical signal in response to acoustic energy received by one of said transducer means; means responsive to detection of said electrical signal for producing a pulse output having a time duration substantially equal to one half-cycle of said electrical signal; a voltage amplifying circuit coupled to said developing means; a current amplifying circuit coupled to said voltage amplifying circuit; a gating circuit shunted across the input to said current amplifying means and responsive to said pulse output to render said current amplifying circuit operative for one preselected half-cycle of said electrical signal; an output circuit coupled to said circuit amplifying circuit for obtaining the peak amplitude of said preselected half-cycle of said electrical signal including unilateral-conducting means and current storage means arranged to obtain the peak value of said preselected half-cycle, said output circuit further including a resistance shunted across said current storage means.

13. In an acoustic logging system for use in a borehole: means for developing an alternating electrical signal in response to acoustic energy in the borehole, circuit means responsive to a given characteristic of said electrical signal for developing a control signal, and means jointly responsive to said electrical signal and said control signal for developing a signal representative of the peak amplitude of a preselected half-cycle only of said electrical signal.

14. In an acoustic logging system for use in a borehole: means for developing an alternating electrical signal in response to acoustic energy in the borehole, circuit means responsive to a given characteristic of said electrical signal for developing a control signal, means jointly responsive to said electrical signal and said control signal for developing a signal representative of the peak amplitude of a preselected half-cycle only of said electrical signal, means at the earth's surface for providing indications of said peak amplitude as a function of depth in the borehole, and means coupling said jointly responsive means to said surface means.

15. Apparatus for acoustic logging in a well bore comprising:
   an acoustic logging tool sized for passage through a well bore wherein the acoustic logging tool has a transmitter of acoustic energy and at least one receiver of acoustic energy which are disposed in fixed relation to one another,
   means for periodically pulsing said transmitter at successive depths in the well bore to periodically develop corresponding pulses of acoustic energy,
   means for deriving from said receiver at each of the successive depths an undulating electrical signal representative of a pulse of acoustic energy which has been emitted from said transmitter and which traverses the media about the well bore,
   means for selectively deriving another electrical signal proportional to a representative peak value of a preselected half-cycle only of each of the undulating electrical signals for each pulse of acoustic energy, and
   means for recording such selectively derived signal as a function of the depth of such tool in the well bore.

16. Apparatus for acoustic logging in a well bore comprising:
   an acoustic logging tool sized for passage through a well bore wherein the acoustic logging tool has a transmitter of acoustic energy and a receiver of acoustic energy which are disposed in fixed relation to one another,
   means for periodically pulsing said transmitter at successive depths in the well bore to periodically develop corresponding pulses of acoustic energy,
   means for deriving from said receiver at each of the successive depths an undulating electrical voltage signal representative of a pulse of acoustic energy which has been emitted from said transmitter and which traverses the media about the well bore,
   means for selectively deriving another electrical signal proportional to the peak amplitude of a preselected half-cycle only of each of the undulating electrical signals for each pulse of acoustic energy, and
   means for recording such selectively derived signal as a function of the depth of such tool in the well bore.

17. Apparatus for acoustic logging in a well bore comprising transmitter and receiver means for emitting and receiving acoustic impulses, means for passing said transmitter and receiver along the length of a well bore, means for:
   periodically actuating said transmitter for generating pulses of acoustic energy at successive locations spaced along the length of a well bore,
   said receiver means successively intercepting each pulse of acoustic energy prior to the time of generation of a succeeding pulse of acoustic energy at second locations which are respectively spaced at a given, fixed distance from each of such first locations,
   means for developing an undulating electrical signal representative of such intercepted acoustic energy for each of said receiver intercepted acoustic pulses at the successive locations,
   means for selectively deriving another electrical signal proportional to a representative peak value of a preselected half-cycle only of each of the undulating electrical signals at the successive locations, and
   means for recording said derived other electrical signals as a function of the depth of said successive locations.

18. Apparatus for measuring acoustic properties of earth formations surrounding a borehole, said apparatus comprising a downhole tool carried by a cable and movable through the borehole, an acoustic energy transmitter on said tool, at least one acoustic receiver carried by said tool and spaced longitudinally of the borehole from said transmitter for producing alternating current electrical signals in response to acoustic energy detected by the receiver from the transmitter, and means responsive to said signal for providing indications as a function of depth in the borehole of the detected acoustic energy, the last named means including an electrical circuit responsive to a selected half cycle of said alternating electrical signals to supply an output signal corresponding to the peak amplitude of said selected half cycle.

19. Apparatus as defined by claim 18 characterized in that said selected half cycle is one-half cycle of the first cycle of the alternating electrical signals.

20. In an acoustic logging system for use in borehole logging operations to determine the characteristics of earth formations penetrated by the borehole by measuring the amplitude of an inital A.C. signal pulse of an A.C. signal train arriving at an acoustic energy receiver from a transmitting source spaced at fixed distance from the receiver, the improvement which comprises means responsive to a predetermined half cycle of said initial signal pulse for developing a D.C. output signal having a duration substantially greater than said predetermined half cycle and having an amplitude proportional to the amplitude of said half cycle, and recording means responsive at least in part to said output signal to provide an indication of the characteristics of the earth formations.

21. In an acoustic logging system for use in borehole logging operations to determine the characteristics of earth formations penetrated by the borehole by measuring the amplitude of a predetermined half cycle of the initially arriving portion of an A.C. signal train arriving at an acoustic energy receiver from a transmitting source spaced longitudinally of the borehole at fixed distance from the receiver, the improvement comprising first circuit means responsive to the predetermined half cycle for developing a D.C. control pulse having a predetermined pulse width sufficient to encompass the peak amplitude portion of said predetermined half cycle, and second circuit means jointly responsive to said control pulse and to said predetermined half cycle for developing a D.C. signal having a duration proportional to said pulse and an amplitude proportional to the peak amplitude of said half cycle.

References Cited
UNITED STATES PATENTS

| | | | |
|---|---|---|---|
| 2,233,992 | 3/1941 | Wyckoff | 181—.53 |
| 2,691,422 | 10/1954 | Summers et al. | 181—0.5 |
| 2,767,388 | 10/1956 | Rust | 181—0.5 |
| 2,857,011 | 10/1958 | Summers | 181—0.5 |
| 2,931,455 | 4/1960 | Loofbourrow | 340—18 X |
| 2,938,592 | 5/1960 | Charske et al. | 181—0.5 |
| 2,956,634 | 10/1960 | Zemanek et al. | 181—0.5 |
| 3,191,145 | 6/1965 | Summers | 340—18 |

BENJAMIN A. BORCHELT, *Primary Examiner.*

CHARLES W. ROBINSON, CHESTER L. JUSTUS, SAMUEL FEINBERG, *Examiners.*

M. J. MARNOCK, S. J. TOMSKY, J. W. MILLS, R. M. SKOLNIK, *Assistant Examiners.*